United States Patent

Murakami

[19]

[11] Patent Number: 5,774,184
[45] Date of Patent: Jun. 30, 1998

[54] COLOR BURST FORMING CIRCUIT AND COLOR BURST GATE PULSE FORMING CIRCUIT

[75] Inventor: Sadakazu Murakami, Kyoto, Japan

[73] Assignee: Rohm Co., Ltd., Kyoto, Japan

[21] Appl. No.: 786,334

[22] Filed: Jan. 23, 1997

[30] Foreign Application Priority Data

Jan. 25, 1996 [JP] Japan .................................... 8-010606

[51] Int. Cl.$^6$ ................................... H04N 9/455
[52] U.S. Cl. ........................................ 348/506; 348/505
[58] Field of Search ..................... 348/505, 506, 348/496, 708, 520, 500, 453, 509; H04N 9/45, 9/455

[56] References Cited

U.S. PATENT DOCUMENTS 4,695,873  9/1987  Smith ...................................... 348/506

FOREIGN PATENT DOCUMENTS 0173879   7/1987   Japan ............................ H04N 9/455
0246991  10/1988   Japan ............................ H04N 9/455
4346591  12/1992   Japan ............................ H04N 9/45
2 163 024 A  2/1986  United Kingdom .

OTHER PUBLICATIONS

"Colour Encoding and Decoding Techniques for Line--Locked Sampled PAL and NTSC Television Signals C.K.P. Clarke, B.Sc. (Eng.), A.C.G.I.", Research Dept., Engineering Division, British Broadcasting Corporation, Mar. 1986.

Primary Examiner—Victor R. Kostak
Attorney, Agent, or Firm—Nikaido, Marmelstein, Murray & Oram LLP

[57] ABSTRACT

A color burst gate pulse forming circuit has a first counter, a second counter, a logic circuit, and a decoding circuit. The first counter counts a chrominance subcarrier supplied in a form of a clock. The second counter starts counting said chrominance subcarrier in synchronization with a horizontal synchronizing signal, and resets itself in a period longer than half a horizontal scanning period and shorter than one horizontal scanning period. The logic circuit controls the operating period of the first counter based on an output from the second counter and said horizontal synchronizing signal. The decoding circuit decodes a count output from the first counter, and outputs color burst gate pulses based on a predetermined count output.

4 Claims, 4 Drawing Sheets

COLOR BURST FORMING CIRCUIT AND COLOR BURST GATE PULSE FORMING CIRCUIT

BACKGROUND OF THE INVENTION

1. Field of the Invention

The present invention relates to a color burst gate pulse forming circuit and a color burst forming circuit for use in a color television signal encoder.

2. Description of the Prior Art

Increasingly various types of peripheral devices have come to be used to feed a television receiver with a color television signal. One typical example of such devices is personal computers. When used for this purpose, a personal computer converts the R, G, and B signals of images created on itself into a color television signal complete with horizontal and vertical synchronizing signals, and also forms a chrominance subcarrier prepared on itself into color bursts.

FIG. 1 shows the well-known conventional method of forming a color burst. First, from a horizontal synchronizing signal H as shown at (a) of FIG. 1, a sawtooth-wave voltage as shown at (b) is formed by means of an integrator. The sawtooth-wave voltage is then compared with reference voltages $V_1$ and $V_2$ to generate pulses ((c) of FIG. 1), and, using these pulses as color burst gate pulses, a chrominance subcarrier is added to a color television signal, as shown at (d) of FIG. 1.

However, in this conventional method, the timing of the color burst gate pulses depends on the capacitance-resistance time constant of the integrator, and therefore variations in capacitor and resistor constants, whether they are due to manufacturing variations or temperature variations, often result in incorrect insertion of color bursts.

SUMMARY OF THE INVENTION

An object of the present invention is to provide a color burst gate pulse forming circuit that can insert color bursts in correct positions.

Another object of the present invention is to provide a color burst forming circuit, provided with the above color burst gate pulse forming circuit, that can invert a color burst every horizontal scanning period.

To achieve the above objects, according to the present invention, a color burst gate pulse forming circuit is provided with a first counter that counts a chrominance subcarrier supplied in a form of a clock; a second counter that starts counting said chrominance subcarrier in synchronization with a horizontal synchronizing signal and resets itself in a period longer than half a horizontal scanning period and shorter than one horizontal scanning period; means that controls an operation period of said first counter based on an output from said second counter and said horizontal synchronizing signal; and means that outputs color burst gate pulses based on a count output from said first counter.

Owing to the above construction, color burst gate pulses are formed by logic-based processing, and are therefore unsusceptible to variations in capacitor and resistor constants or variations in temperature. Thus, it is possible to obtain color burst gate pulses that constantly keep correct timing.

Moreover, according to the present invention, a color burst forming circuit is provided with a first counter that counts a chrominance subcarrier supplied in a form of a clock; a second counter that starts counting said chrominance subcarrier in synchronization with a horizontal synchronizing signal and resets itself in a period longer than half a horizontal scanning period and shorter than one horizontal scanning period; means that controls an operation period of said first counter based on an output from said second counter and said horizontal synchronizing signal; means that outputs color burst gate pulses based on a count output from said first counter; a flip-flop that is triggered in synchronization with starting of counting operation of said second counter and that inverts its output pulses every time triggering occurs; and a PAL switch that inverts said chrominance subcarrier every horizontal scanning period based on an output from said flip-flop.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
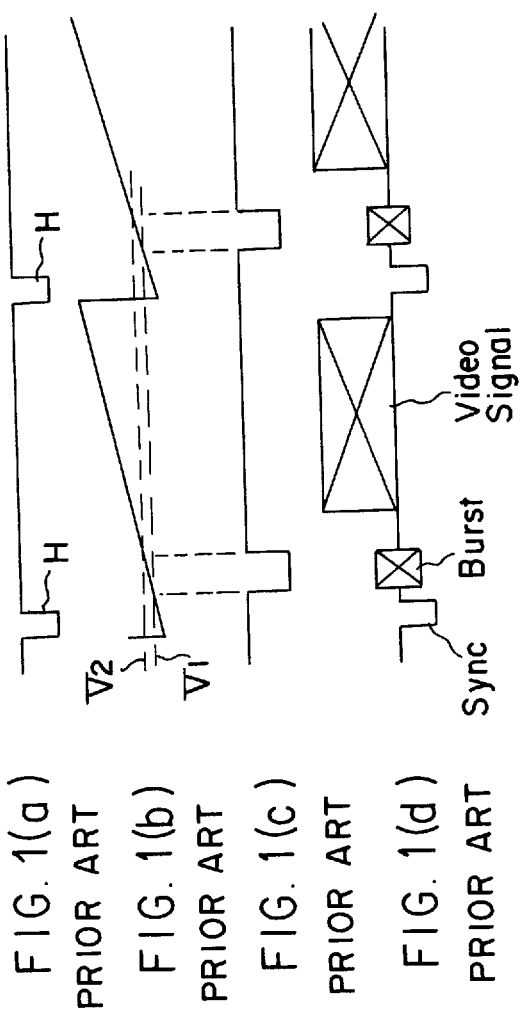
FIG. 1 is a diagram explaining a conventional method of forming a color burst.
Figure 2:
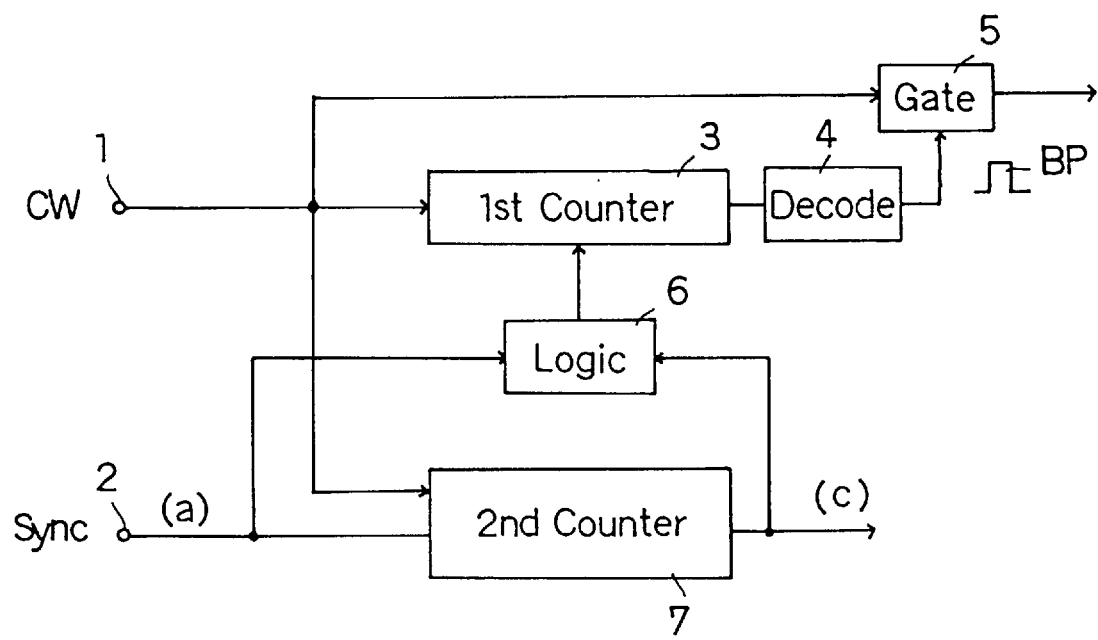
FIG. 2 is a circuit diagram showing an embodiment of the color burst gate pulse forming circuit of the present invention.

Hereinafter, embodiments of the present invention will be described with reference to the drawings. In FIG. 2, reference numeral 1 represents an input terminal to which a chrominance subcarrier CW is supplied (here, the chrominance subcarrier CW is supplied not as a sine-wave signal, but as a clock), and reference numeral 2 represents an input terminal to which synchronizing pulses are supplied. Reference numeral 3 represents a first counter for forming burst gate pulses, and reference numeral 4 represents a decoding circuit for decoding an output from the first counter 3 to output pulses (burst gate pulses) having a pulse width corresponding to a period starting with a first predetermined count and ending with a second predetermined count. Reference numeral 5 represents a gate circuit for extracting part of the chrominance subcarrier CW supplied from the input terminal 1 in accordance with the burst gate pulses BP in order to output the extracted signal as color bursts.

Reference numeral 6 represents a logic circuit for performing logic operations between the horizontal synchronizing pulses supplied from the input terminal 2 and the output from a second counter 7 in order to activate the first counter 3 only during a period in which the logic operations yield an output. The second counter 7 starts counting the chrominance subcarrier CW in synchronization with the trailing edges (e.g. at time $t_0$ for the pulse H1) of the horizontal synchronizing pulses H1, H2, H3, H4, ... shown at (a) of FIG. 3, and resets itself at time $t_4$. As a result, the output from the second counter 7 has a waveform as shown at (b) of FIG. 3. This output is supplied to a flip-flop 8 as shown in the later-described FIG. 4, and is used to form a signal for inverting the color bursts in the PAL color television system.

The output of the second counter 7 is also supplied to the logic circuit 6, where it is processed together with the horizontal synchronizing signal from the input terminal 2 by AND operation. The output from this logic circuit 6 is, as shown at (c) of FIG. 3, a pulse signal having a pulse width corresponding to the period of the horizontal synchronizing signal subtracted from the output ((b) of FIG. 3) from the second counter 7. The first counter 3 starts counting in synchronization with the leading edges (corresponding to $t_1$) of the output from the logic circuit 6. In the embodiment under discussion, counting is continued until $t_4$, and resetting takes place at $t_4$. Meanwhile, the decoding circuit 4 generates a burst gate pulse BP having a pulse width corresponding to the time period between $t_2$ and $t_3$. Note that the first counter 3 may also be so configured as to reset itself within the period between $t_3$ and $t_4$.

Figure 3:
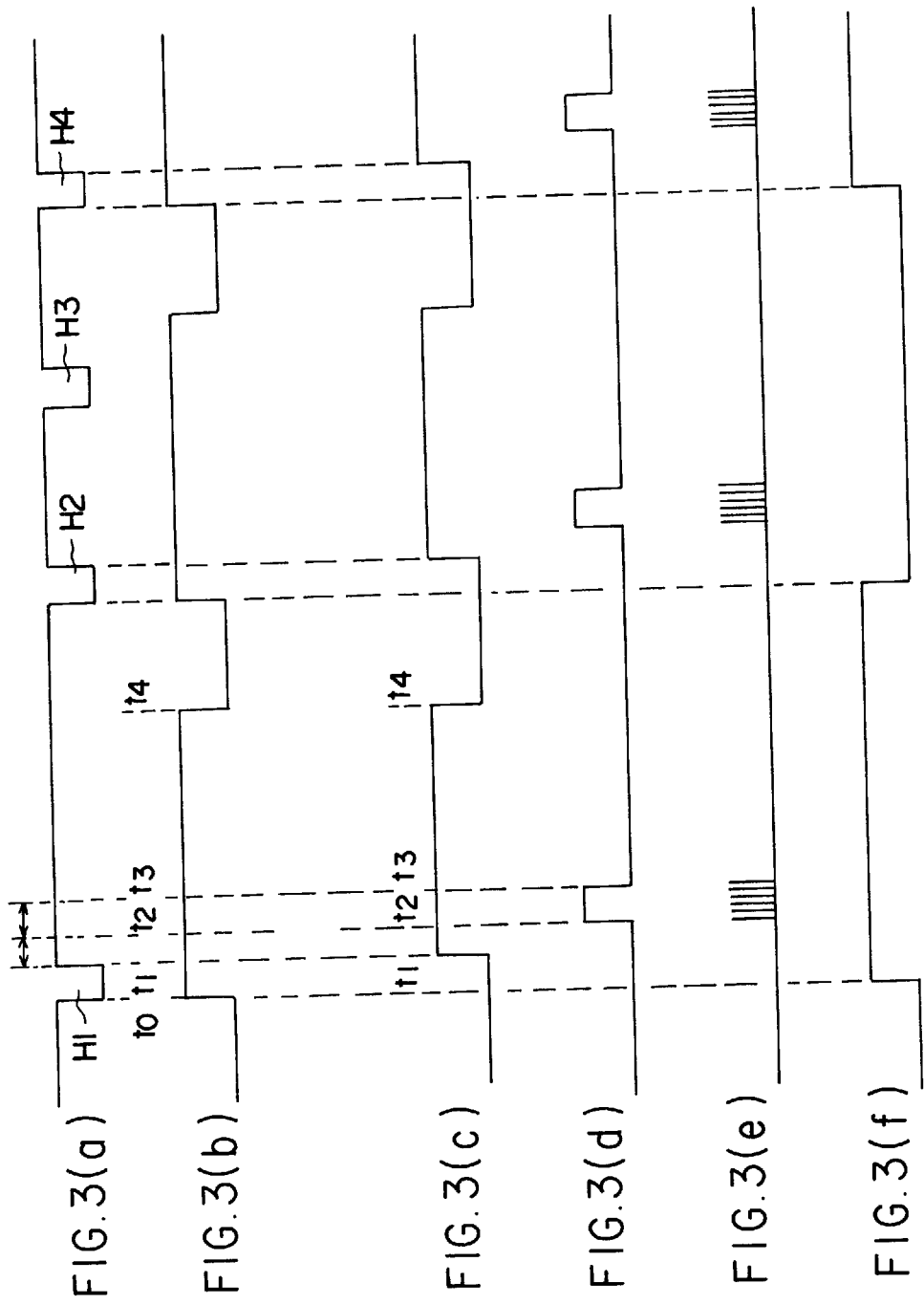
FIG. 3 is a diagram showing waveforms observed in the embodiment.

The above described operations that are performed for the first horizontal synchronizing pulse H1 shown in FIG. 3 are also performed for the succeeding horizontal synchronizing pulses H2, H3, H4, . . . , except for H3, which is a half horizontal synchronizing pulse. This is because the circuit shown in FIG. 2 suppresses half horizontal synchronizing pulses. Specifically, the second counter 7 is designed to have an operation period longer than half a horizontal scanning period and shorter than one horizontal scanning period (see (c) of FIG. 3).

Subsequently, the gate circuit 5 extracts part of the chrominance subcarrier CW in accordance with the burst gate pulses BP formed by the decoding circuit 4, and thus color bursts as shown at (e) of FIG. 3 are obtained intermittently at correct intervals.

Figure 4:
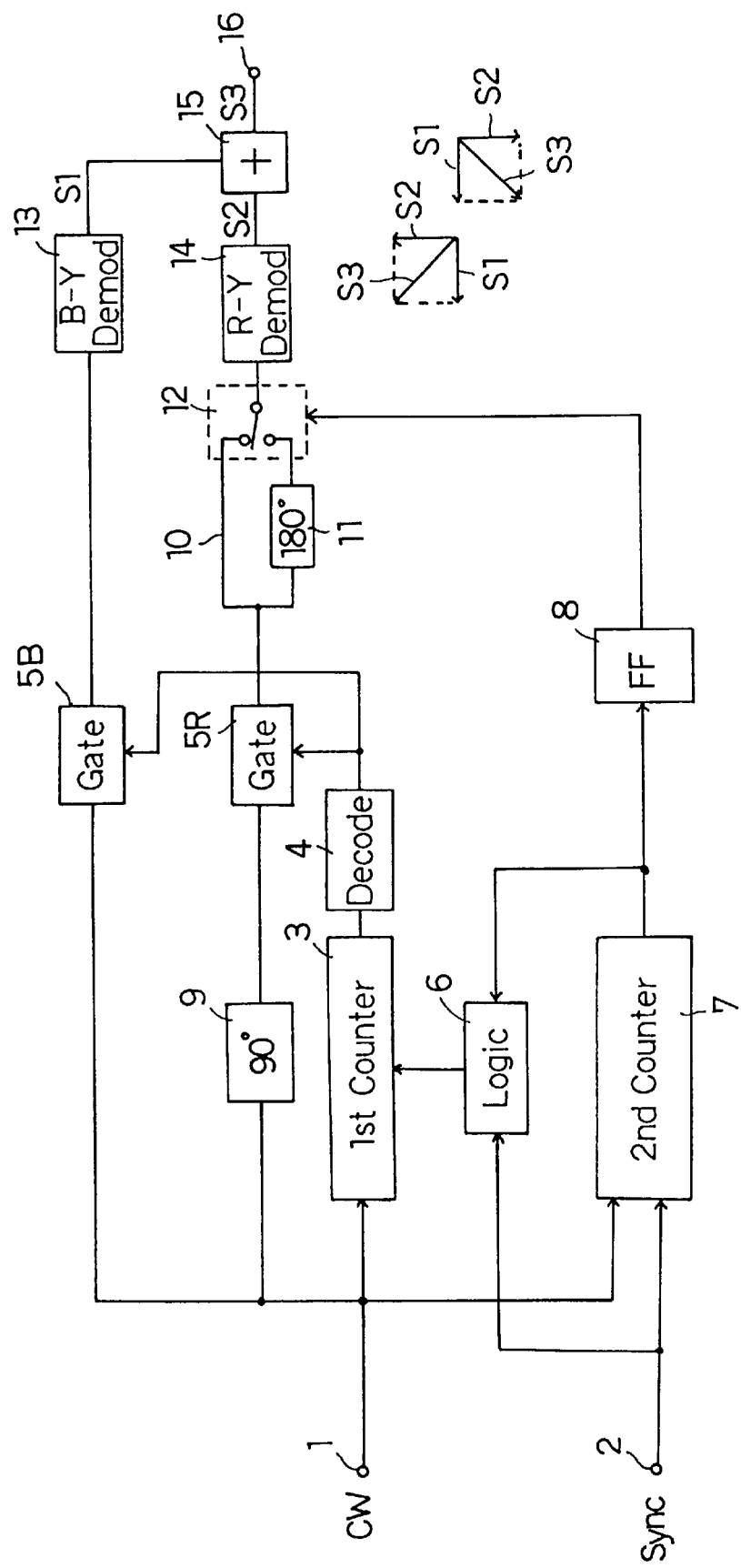
FIG. 4 is a circuit diagram showing an embodiment of the color burst forming circuit of the present invention.

FIG. 4 shows a second embodiment that is so constructed as to form color bursts for television signals in the PAL color television system. In FIG. 4, the same circuit elements as are shown in FIG. 2 are identified by the same designations, and the descriptions of such elements will not be repeated.

In FIG. 4, reference numeral 9 represents a phase shifter for shifting the phase of a chrominance subcarrier CW by 90°. The output from the phase shifter 9 is supplied to a gate circuit 5R. Reference numeral 8 represents a flip-flop for generating an output ((f) of FIG. 3) that is inverted in synchronization with the trailing edges of the output ((b) of FIG. 3) from a second counter 7. The flip-flop 8 switches a PAL switch 12 every horizontal scanning period. Reference numeral 10 represents a signal path through which the color bursts outputted from the gate circuit 5R are supplied directly to the PAL switch 12, and reference numeral 11 represents an inverter by which the color bursts are inverted by 180°0 before being supplied to the PAL switch 12.

The color bursts S2 that are inverted by the PAL switch 12 every horizontal scanning period are supplied through an R-Y modulator 14 to an adder 15, where they are combined with the color bursts S1 that are separately supplied from the input terminal through a gate circuit 5B and a B-Y modulator 13, so that composite color bursts S3 are obtained.

Note that, in reality, the B-Y modulator 13 and the R-Y modulator 14 are respectively supplied with R-Y and B-Y chrominance signals, though this is not illustrated in FIG. 4. Moreover, it is also possible to omit the gate circuits 5B and 5R and instead provide the B-Y and R-Y modulators with a gating function so that the gate pulses from the decoding circuit 4 are supplied directly to these modulators. Furthermore, in the case where the chrominance subcarrier CW supplied to the input terminal 1 has the same phase as S2 or S3, the 90° phase shifter 9 needs to be inserted not in the path via the gate circuit 5R but in the path via the gate circuit 5B.

In the above described embodiments, the second counter 7 needs to count a relatively small number, specifically from $t_0$ to $t_4$. Accordingly, it is possible to reduce the number of counting stages required in the second counter. Moreover, the first counter 3 needs to count a still smaller number than the second counter. Accordingly, it is possible to further reduce the number of counting stages required in the first counter.

As described above, according to the present invention, color burst gate pulses and color bursts are formed by logic-based processing, and therefore they are unsusceptible to manufacturing variations or temperature variations. As a result, it is possible to insert color bursts in correct positions.

Moreover, according to the present invention, the above color burst gate pulse forming circuit can readily be used to generate a PAL switch driving signal.

What is claimed is:

1. A color burst gate pulse forming circuit comprising:

a first counter that counts a chrominance subcarrier supplied in a form of a clock;

a second counter that starts counting said chrominance subcarrier in synchronization with a horizontal synchronizing signal and resets itself in a period longer than half a horizontal scanning period and shorter than one horizontal scanning period;

means that controls an operation period of said first counter based on an output from said second counter and said horizontal synchronizing signal; and means that outputs color burst gate pulses based on a count output from said first counter.

2. A color burst gate pulse forming circuit as claimed in claim 1, wherein said second counter starts counting in synchronization with leading edges of the horizontal synchronizing signal, wherein said means that controls an operation period of said first counter outputs pulses having a pulse width corresponding to a period of the horizontal synchronizing signal subtracted from a period of the output from said second counter, and wherein said means that outputs color burst gate pulses outputs pulses having a pulse width corresponding to a period starting with a first predetermined count of said first counter and ending with a second predetermined count thereof.

3. A color burst forming circuit comprising:

a first counter that counts a chrominance subcarrier supplied in a form of a clock;

a second counter that starts counting said chrominance subcarrier in synchronization with a horizontal synchronizing signal and resets itself in a period longer than half a horizontal scanning period and shorter than one horizontal scanning period;

means that controls an operation period of said first counter based on an output from said second counter and said horizontal synchronizing signal;

means that outputs color burst gate pulses based on a count output from said first counter;

a flip-flop that is triggered in synchronization with starting of counting operation of said second counter and that inverts its output pulses every time triggering occurs; and a PAL switch that inverts said chrominance subcarrier every horizontal scanning period based on an output from said flip-flop.

4. A color burst forming circuit as claimed in claim 3, wherein said second counter starts counting in synchronization with leading edges of the horizontal synchronizing signal, wherein said means that controls an operation period of said first counter outputs pulses having a pulse width corresponding to a period of the horizontal synchronizing signal subtracted from a period of the output from said second counter, and wherein said means that outputs color burst gate pulses outputs pulses having a pulse width corresponding to a period starting with a first predetermined count of said first counter and ending with a second predetermined count thereof.

* * * * *